Patented Aug. 11, 1936

2,050,557

UNITED STATES PATENT OFFICE 2,050,557

NEW THERAPEUTICALLY ACTIVE UREA- AND THIOUREA-DERIVATIVES

Max Bockmühl and Walter Persch, Frankfort-on-the-Main, and Erich Bartholomäus, Wiesbaden-Biebrich, Germany, assignors to Winthrop Chemical Company, Inc., New York, N. Y., a corporation of New York No Drawing. Application September 29, 1931, Serial No. 565,916. In Germany October 9, 1930

4 Claims. (Cl. 260—125)

The present invention relates to new therapeutically active urea- and thiourea-derivatives.

We have found that urea or thiourea derivatives of the aromatic, heterocyclic or aromatic-heterocyclic series which contain a basic side-chain, the basic nitrogen of which is bound to an aliphatic radical, are substances of a great value for therapeutical purposes. These new products have the following general formula

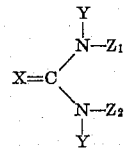

wherein X stands for oxygen or sulfur, Y stands for hydrogen, alkyl or aryl, $Z_1$ stands for hydrogen, alkyl, aryl, alkenyl, a basic alkyl radical or aryl with a basic side chain, a heterocyclic or a hydroaromatic radical, $Z_2$ stands for alkyl, aryl, a basic alkyl radical or aryl with a basic side-chain, or $Z_1$ and $Z_2$ stand together for an aromatic radical bound in two adjacent positions and containing a basic side-chain, but at least $Z_1$ or $Z_2$ stand for a radical being or containing a basic side-chain, the basic nitrogen atom of which is bound to an aliphatic radical.

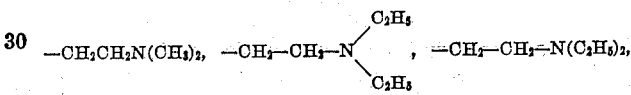

They can be prepared in various ways. It is possible to start from primary or secondary amines of the aromatic, heterocyclic or aromatic-heterocyclic series containing at any place at least one basic side chain, the basic nitrogen of which is bound to an aliphatic radical and to transform these compounds into urea or thiourea derivatives according to known methods, for instance, by causing them to react with compounds of the kind of potassium cyanate or potassium rhodanate or the like, as well as with iso-cyanate, such as phenyl-iso-cyanate, phenyl mustard oil or the like or with urea- or thiourea-chlorides etc. By starting from amino compounds containing in the molecule only one amino group, the urea- or thiourea-groups in the reaction products are combined with aromatic, heterocyclic and aromatic-heterocyclic nuclei so as to have the form of a chain. If the starting materials, however, contain several amino-groups in the molecule, especially in ortho-position, cyclic urea- and thiourea derivatives are obtained, such as phenylene urea or phenylene thiourea (benzimidazolones and thiobenzimidazoles). The basic side-chains may be in any place of the molecule, for instance, in the aromatic or heterocyclic nuclei and in the amino-groups of the urea- or thiourea-nuclei. Furthermore, the basic side-chains may be fixed by carbon linkage; it may also be fixed by means of oxygen, sulfur or nitrogen linkage or any other suitable group.

The new compounds may also be prepared by starting from urea or thiourea derivatives of the aromatic or heterocyclic or aromatic-heterocyclic series containing no basic aliphatic radical and introducing a basic radical or side-chain, the nitrogen of which is bound to an aliphatic radical, according to known methods. It may be preferable to start in this case from such urea or thiourea derivatives as contain in the molecule groups suitable for fixing the basic side-chain.

There can be used as basic groups or basic side-chains, for instance, organic groups of the following type:

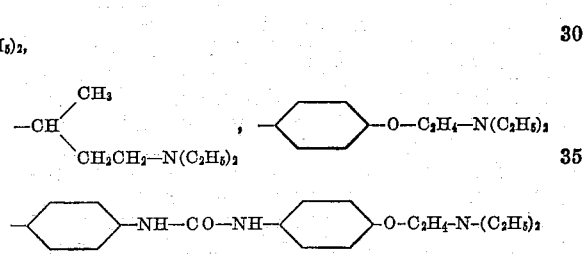

Substituted ureas and thioureas have already been prepared from aromatic amines, but in comparison with these compounds the new substances containing a basic side-chain with aliphatically bound nitrogen have the advantage of possessing a specifically bactericidal action which is especially suitable for combatting the excitant of epidemic premature calving, the so-called Abortus Bang.

There is furthermore the advantage that most of the new products, especially in form of their salts, can be dissolved in suitable solvents, as for instance water, and thus be used in a dissolved form for injecting purposes.

The following examples serve to illustrate the invention, but they are not intended to limit it thereto.

(1) 41.6 grams of para-beta-diethylamino-ethoxyaniline are mixed while cooling with 23.8 grams of phenylisocyanate. After the heat of the reaction has abated, the crystalline mass formed is washed with ether and water. The urea obtained, a white crystalline compound with a melting point of 164° C., is dissolved in the calculated quantity of normal hydrochloric acid and the solution, from which the undissolved matter has been eliminated by filtration, is evaporated to dryness. The hydrochloride of the N-phenyl-N'-diethylaminoethoxyphenyl-urea thus obtained melts at 190° C. It has the following formula

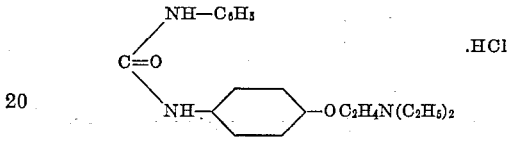

(2) 147 grams of phenyl mustard oil are mixed with 226 grams of para-beta-diethylamino-ethoxyaniline and, after the reaction which occurs with much evolution of heat, is complete, the whole is heated for ¼ hour on the steam bath. On cooling the whole becomes a hard crystalline cake of the thiourea derivative formed, which is well triturated with hexahydrobenzene. The substance melts at 101° C. The hydrochloric acid solution from which the undissolved matter has been eliminated by filtration is evaporated. The hydrochloride of the N-phenyl-N'-diethyl-aminoethoxyphenyl-thiourea remains, and, when recrystallized from alcohol of 95 per cent. strength, melts at 161° C.–163° C. It has the following formula

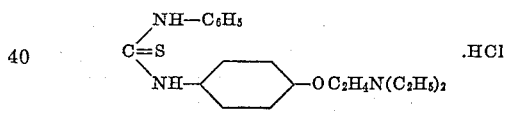

(3) 41.6 grams of para-beta-diethylamino-ethoxyaniline are dissolved in 300 cc. of benzene and 10.6 grams of anhydrous sodium carbonate are added. Phosgene is introduced at about 15° C. while stirring for 6 hours. The precipitate obtained gradually becomes more and more solid, until, when the reaction is nearly complete, a hard mass covers the wall of the flask and the benzene is completely clear. After evaporation of the benzene, the residue is taken up in water, filtered and the solution is rendered alkaline to phenolphthalein, whereby the urea derivative is caused to separate in the form of a white compound which is washed with ether and water and then directly dissolved in the calculated quantity of normal hydrochloric acid. The solution is evaporated to dryness; the residue is dissolved in 250 cc. of alcohol and by pouring the solution into 1 liter of acetone the hydrochloride of the symmetrical bis-diethylamino-ethoxyphenylurea is obtained. It has the following formula

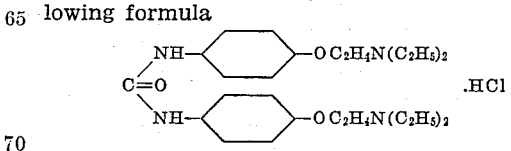

and melts at 127° C.

(4) 20.8 grams of para-beta-diethylaminoeth-oxyaniline and 10 grams of allyl mustard oil are heated together on the vapour bath for 15 minutes. The cooled crystalline cake is triturated with hexahydrobenzene to a powder which has a melting point of 78° C. It is then dissolved in normal hydrochloric acid until it shows a feebly acid reaction to litmus paper; the filtered solution is evaporated. The syrupy residue gradually becomes a white crystalline mass which is the hydrochloride of the N-allyl-N'-diethylamino-ethoxyphenylthiourea. It has the following formula

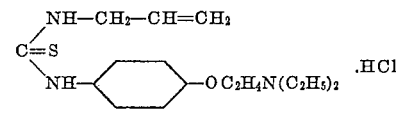

(5) 41.6 grams of para-beta-diethylaminoeth-oxyaniline are dissolved in 200 cc. of normal hydrochloric acid and the solution is mixed with 20 grams of potassium thiocyanate. The whole soon crystallizes. By heating a solution is obtained from which, after filtration and cooling, the urea derivative is obtained in the form of beautiful white crystals. The diethylaminoethoxyphenyl-thiourea of the following formula

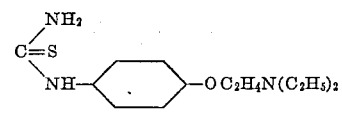

is recrystallized from alcohol and melts at 101° C.

(6) 2.5 grams of N-(alpha-pyridyl)-N'-(para-hydroxyphenyl)-thiourea are boiled with 1.5 grams of diethylaminochlorethane in absolute alcohol. The alcohol is evaporated under reduced pressure and the residue is taken up in water and the calculated quantity of normal hydrochloric acid (10 cc.). After filtration, the filtrate is evaporated to dryness, whereby the hydrochloride of the desired urea derivative, namely of N-(alpha-pyridyl)-N'-(para-diethylaminoethoxyphenyl)-thiourea is obtained. It has the following formula

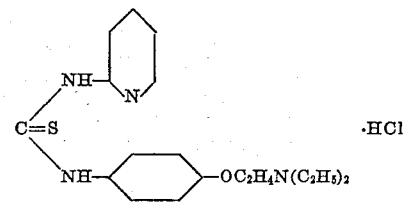

The obtained salt is a hygroscopic powder.

The parent material may be prepared by heating 29 grams of para-hydroxyphenyl mustard oil and 18.1 parts of alpha-aminopyridine on a steam bath; when the reaction is complete, the N-(alpha-pyridyl)-N'-(para-hydroxyphenyl)-thiourea so produced is recrystallized from alcohol of 70 per cent. strength and is thus obtained in the form of a white powder melting at 218° C.

(7) 119 grams of 1-diethylaminoethoxy-3-nitro-4-aminobenzene are reduced to the corresponding diamine by means of palladium and hydrogen and the latter is transformed immediately after separation of the palladium by treatment with 79 grams of caustic potash and 75.3 grams of potassium xanthate into the 5-diethyl-aminoethoxy-2-mercaptobenzimidazole having the following formula

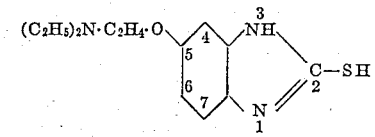

By dissolving the product in alcoholic hydrochloric acid and precipitating with ether, the pure hydrochloride of the basic cyclic thiourea is obtained, having a melting point of 230° C.–231° C.

(8) 14.7 grams of N-cyclohexyl-N'-(para-hydroxyphenyl)-thiourea (melting at 174° C. and prepared by reaction between cyclohexylamine and para-hydroxyphenyl-mustard oil) are boiled for 5 hours, while stirring, together with 3.12 grams of sodium carbonate and 8 grams of diethylaminochlorethane in 150 cc. of acetone. After filtration and evaporation of the acetone, the residue is taken up in dilute hydrochloric acid. After the clear hydrochloric acid solution has been evaporated to dryness the dihydrochloride of N-cyclohexyl-N'-(para-diethylamino-ethoxyphenyl)-thiourea is obtained. It has the following formula

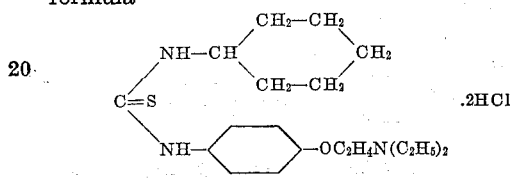

It decomposes at 210° C.–212° C.

(9) 4.7 grams of N-para-hydroxyphenyl-N'-mercapto-benzimidazolyl-thiourea, 0.8 gram of sodium carbonate and 2.5 grams of diethylamino-chloro-ethane are boiled for 3 hours in 75 cc. of acetone and 50 cc. of methyl alcohol. The sodium chloride is filtered by suction and the filtrate is evaporated in a vacuum. The residue is taken up in water feebly acidified with hydrochloric acid, the undissolved matter is eliminated by filtration and the filtrate is concentrated in a vacuum. The greenish syrup thus obtained is dissolved in absolute alcohol and the solution is dropped on acetic ester, whereby the N-para-diethylaminoethoxyphenyl-N'-mercapto-benzimidazolyl-thiourea precipitates in the form of a light yellow hygroscopic powder. It has the following formula

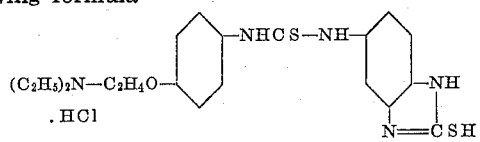

The parent material used for the reaction is prepared as follows: 3.3 grams of 6-amino-2-mercaptobenzimidazole and 3.0 grams of para-hydroxyphenyl mustard oil are heated in the tube for 4 hours at 120° C. together with 25 cc. of benzene. The product thus obtained is washed with benzene and then freed from unaltered amine by means of water acidified with hydrochloric acid. The residue is N-para-hydroxyphenyl-N'-mercaptobenzimidazolyl-thiourea which melts at 242° C.–244° C.

(10) 20.35 grams of 1-chloronaphthyl-2-isocyanate are dissolved in the heat in 200 cc. of hexahydrobenzene and the solution is mixed with 20.8 grams of para-diethylamino-ethoxy-aniline in 50 cc. of hexahydrobenzene. The urea separates which melts at 168° C.–169° C. It has the following formula

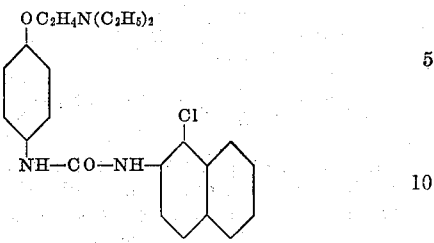

(11) 7.5 grams of N-para-normal-butylphenyl-N'-para-hydroxyphenyl-thiourea, 3.4 grams of potash and 3.4 grams of diethylamino-chloroethane are boiled in 100 cc. of acetone and the whole is worked up as indicated in Example 9. The hydrochloride of the N-para-normal-butylphenyl-N'-diethylaminoethoxyphenylthiourea is obtained. It has the following formula

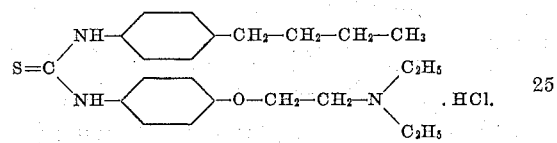

The parent material is prepared as follows: 14.9 grams of para-normal-butylaniline and 15.1 grams of para-hydroxyphenyl mustard oil are boiled together with 150 cc. of hexahydrobenzene. The urea which separates melts at 157° C.–159° C.

(12) 8 grams of meta-phenylene-diisocyanate and 20.8 grams of diethylaminoethoxyaniline are heated for a short time with hexahydrobenzene. The urea which has been formed and melts at 184° C. is dissolved in the calculated quantity of normal hydrochloric acid and the solution is evaporated. The hydrochloride of meta-phenylene-di-(diethylaminoethoxyphenylurea) remains. It has the following formula

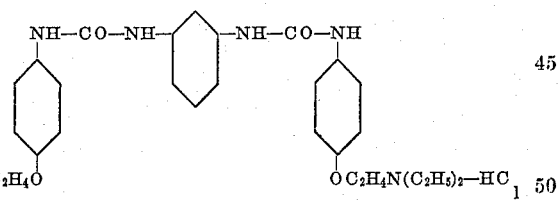

(13) 33.5 grams of 2-methyl-3-chloro-1-phenylisocyanate and 41.6 grams of diethylaminoethoxyaniline are boiled for ½ hour together with 300 cc. of hexahydrobenzene. 72 grams of N-diethylaminoethoxyphenyl-N'-methylchlorophenylurea are obtained which has the following formula

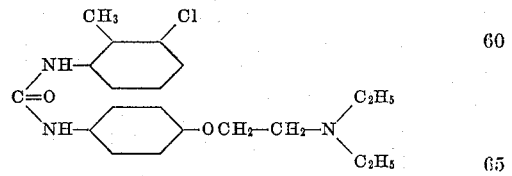

It melts at 156° C.–157° C. The hydrochloride dissolves in water to a strongly foaming solution.

(14) 10.4 grams of para-hydroxyphenyl mustard oil and 14.3 grams of diethylaminoethoxyaniline are heated in hexahydrobenzene. N-diethylaminoethoxyphenyl-N'-parahydroxyphenylurea is obtained which melts at 110° C.; it is dissolved in the calculated quantity of normal hydrochloric acid. On evaporating the solution, the hydrochloride crystallizes which melts at 174° C.–176° C. and has the following formula

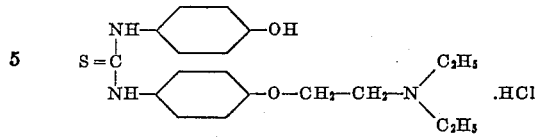

It is to be understood that the following claims are intended to cover not only the free bases but also the corresponding salts thereof. The term "basic side chain" is intended to comprise not only basic side chains bound by a carbon atom, but also those bound by oxygen, sulfur, an amino-group or the like, as for instance, alkoxy or mercapto groups and chiefly such basic side chains, wherein the basic nitrogen atom is bound to an aliphatic radical.

We claim:

1. The compound of the following formula

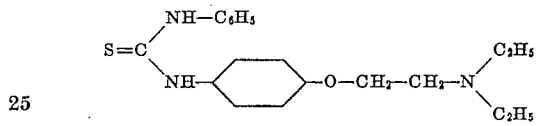

being a white crystalline powder, melting at 101° C. and forming with hydrochloric acid a salt melting at 161–163° C.

2. The compound of the following formula:

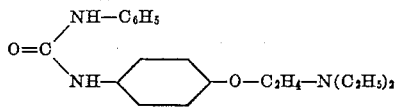

being a white crystalline substance melting at 169° C. and forming with hydrochloric acid a salt melting at 190° C.

3. The compound of the following formula

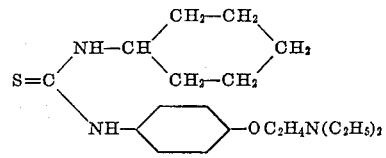

forming with hydrochloric acid a salt decomposing at 210° C.–212° C.

4. The compounds of the following general formula:

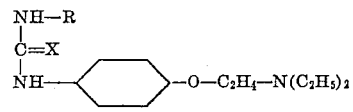

wherein X is a member of the group oxygen and sulfur and R is a member of the group hydrogen, unsaturated lower alkyl, phenyl, hexahydrophenyl, 4 n-butylphenyl, 4-hydroxyphenyl, 4-(diethylaminoethyloxy) phenyl, 2-methyl-3-chlorophenyl and alpha-chloronaphthyl.

MAX BOCKMÜHL.
WALTER PERSCH.
ERICH BARTHOLOMÄUS.